United States Patent
Chun et al.

(10) Patent No.: US 8,462,655 B2
(45) Date of Patent: Jun. 11, 2013

(54) METHOD FOR ACQUIRING MULTI-CELL SPECIFIC MESSAGE IN WIRELESS COMMUNICATION SYSTEM

(75) Inventors: Jin Young Chun, Anyang-si (KR); Sung Ho Park, Anyang-si (KR); Hyun Soo Ko, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 257 days.

(21) Appl. No.: 12/988,504

(22) PCT Filed: Apr. 14, 2009

(86) PCT No.: PCT/KR2009/001910
§ 371 (c)(1),
(2), (4) Date: Oct. 18, 2010

(87) PCT Pub. No.: WO2009/134022
PCT Pub. Date: Nov. 5, 2009

(65) Prior Publication Data
US 2011/0038320 A1    Feb. 17, 2011

Related U.S. Application Data

(60) Provisional application No. 61/048,951, filed on Apr. 30, 2008.

(30) Foreign Application Priority Data

Jul. 14, 2008   (KR) ........................ 10-2008-0067888

(51) Int. Cl.
*H04J 1/16* (2006.01)
*H04B 7/208* (2006.01)

(52) U.S. Cl.
USPC .......................... 370/252; 370/208; 370/344

(58) Field of Classification Search
None
See application file for complete search history.

(56) References Cited

U.S. PATENT DOCUMENTS

| | | | | |
|---|---|---|---|---|
| 2001/0017897 A1* | 8/2001 | Ahn | ............................... | 375/261 |
| 2005/0243942 A1* | 11/2005 | Sawai | ........................... | 375/267 |
| 2008/0056188 A1* | 3/2008 | Lu et al. | ........................ | 370/330 |
| 2009/0022097 A1* | 1/2009 | Yoon et al. | .................... | 370/329 |
| 2009/0129493 A1* | 5/2009 | Zhang et al. | ................. | 375/260 |
| 2010/0002617 A1* | 1/2010 | Seyama | ....................... | 370/312 |
| 2010/0008282 A1* | 1/2010 | Bhattad et al. | ............... | 370/312 |
| 2010/0208894 A1* | 8/2010 | True et al. | ..................... | 380/270 |
| 2011/0070850 A1* | 3/2011 | Kwon et al. | .................. | 455/129 |

FOREIGN PATENT DOCUMENTS

| | | |
|---|---|---|
| EP | 1037491 A1 | 9/2000 |
| WO | 2005/104411 A1 | 11/2005 |
| WO | 2007/149133 A2 | 12/2007 |

* cited by examiner

*Primary Examiner* — Andrew Lew
(74) *Attorney, Agent, or Firm* — Lee, Hong, Degerman, Kang & Waimey (57) ABSTRACT

A method for acquiring a multi-cell specific message in a wireless communication system includes receiving a downlink preamble, receiving the multi-cell specific message weighted with the downlink preamble, and decoding the weighted multi-cell specific message by using the received downlink preamble. Accordingly, since a preamble is used to transmit a multi-cell specific message, there is no need to transmit an additional signal in order to estimate a channel of the multi-cell specific message. In addition, a user equipment can acquire the multi-cell specific message by simply performing decoding.

10 Claims, 5 Drawing Sheets

METHOD FOR ACQUIRING MULTI-CELL SPECIFIC MESSAGE IN WIRELESS COMMUNICATION SYSTEM

This application is the National Stage filing under 35 U.S.C. 371 of International Application No. PCT/KR2009/001910, filed on Apr. 14, 2009, which claims the benefit of earlier filing date and right of priority to Korean Application No. 10-2008-0067888, filed on Jul. 14, 2008, and also claims the benefit of U.S. Provisional Application Serial No. 61/048,951, filed on Apr. 30, 2008, the contents of which are incorporated by reference herein in their entirety.

TECHNICAL FIELD

The present invention relates to wireless communications, and more particularly, to a method for acquiring a multi-cell specific message.

BACKGROUND ART

Wireless communication systems are widely used to provide various types of communications. For example, voice and/or data are provided by the wireless communication systems. A conventional wireless communication system provides multiple users with one or more shared resources. For example, the wireless communication system can use various multiple access schemes such as code division multiple access (CDMA), time division multiple access (TDMA), and frequency division multiple access (FDMA).

Orthogonal frequency division multiplexing (OFDM) uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers. According to the OFDM, complexity of the receiver can be reduced in a frequency selective fading environment of a broadband channel, and spectral efficiency can be increased when selective scheduling is performed in a frequency domain by using a channel characteristic which is different from one subcarrier to another. Orthogonal frequency division multiple access (OFDMA) is an OFDM-based multiple access scheme. According to the OFDMA, efficiency of radio resources can be increased by allocating different subcarriers to multiple users.

In the wireless communication systems, one or more cells are included in the coverage of a base station (BS). A plurality of user equipments (UEs) can be located in one cell. The BS provides a data service to the UEs located in the cell. Data transmitted by the BS to the UEs may be unicast data, multicast data, or broadcast data. The unicast data is a message transmitted to a specific UE. The multicast data is a message transmitted to a specific UE group. The broadcast data is a message transmitted to all UEs. The broadcast data includes a cell specific message limited to one cell and a multi-cell specific message common to a plurality of cells. The multi-cell specific message can be referred to as a single frequency network (SFN) message.

When a UE initially accesses to a new cell, the UE performs downlink synchronization and receives system information of a network to be accessed. The BS transmits a preamble according to a predetermined period so that the UE can perform the downlink synchronization. The preamble is a specific sequence provided for each of a plurality of BSs. The preamble may include information such as a cell identifier (ID). In a multiple antenna system using a plurality of antennas, the preamble can be transmitted using difference sequences for respective transmit antennas of the BSs. By using the preamble, the UE can perform downlink synchronization and channel estimation. The system information is necessary information which must be known to the UE to communicate with the BS. The system information can be transmitted using a cell specific message or a multi-cell specific message.

The multi-cell specific message is a message commonly transmitted from a plurality of BSs. The UE performs decoding by combining the multi-cell specific messages of the respective BSs. To combine the multi-cell specific message of the respective BSs, the UE has to estimate a channel of each multi-cell specific message and then compensate for a channel value. Estimating of the multi-cell specific messages of the respective BSs and compensating for the channel value may produce a large overhead in a process of decoding the multi-cell specific messages.

Accordingly, there is a need for a method capable of effectively transmitting and/or acquiring a plurality of multi-cell specific messages.

DISCLOSURE OF INVENTION

Technical Problem

The present invention provides a method for effectively transmitting and/or acquiring a multi-cell specific message.

Technical Solution

In an aspect, a method for acquiring a multi-cell specific message in a wireless communication system includes receiving a downlink preamble, receiving the multi-cell specific message weighted with the downlink preamble, and decoding the weighted multi-cell specific message by using the received downlink preamble.

In another aspect, a method for transmitting a multi-cell specific signal in a wireless communication system includes multiplexing a first signal specifically provided for each cell with a second signal commonly provided for multiple cells to generate a weighted signal of the second signal, and transmitting the weighted signal of the second signal on a plurality of subcarriers in a frequency domain.

ADVANTAGEOUS EFFECTS

According to the present invention, a preamble is used to transmit a multi-cell specific message, and thus there is no need to transmit an additional signal in order to estimate a channel of the multi-cell specific message. In addition, a user equipment can acquire the multi-cell specific message by simply performing decoding.

MODE FOR THE INVENTION

Figure 1:
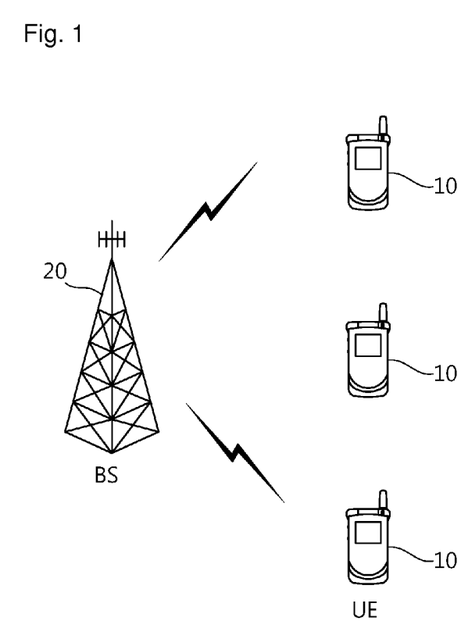
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

A downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system can use a scheme using multiple antennas. In case of a rank 1, the scheme may be space-time coding (STC) (e.g., space frequency block code (SFBC) and space time block code (STBC)), cyclic delay diversity (CDD), frequency switched transmit diversity (FSTD), time switched transmit diversity (TSTD), etc. In case of a rank 2 or higher ranks, the scheme may be spatial multiplexing (SM), generalized cyclic delay diversity (GCDD), selective virtual antenna permutation (S-VAP), etc. The SFBC is a scheme for effectively applying selectivity in a space domain and a frequency domain to ensure both a diversity gain and a multi-user scheduling gain in a corresponding dimension. The STBC is a scheme for applying selectivity in the space domain and a time domain. The FSTD is a scheme in which signals transmitted to multiple antennas are divided in the time domain, and the TSTD is a scheme in which the signals transmitted to the multiple antennas are divided in the frequency domain. The SM is a scheme for transmitting different data to each antenna to improve a data rate. The GCDD is a scheme for applying selectivity in the time domain and the frequency domain. The S-VAP is a scheme using a single precoding matrix, and includes a multi-codeword (MCW) S-VAP for mixing multi-codewords to antennas in spatial diversity or spatial multiplexing and a single codeword (SCW) S-VAP using a single codeword.

Figure 2:
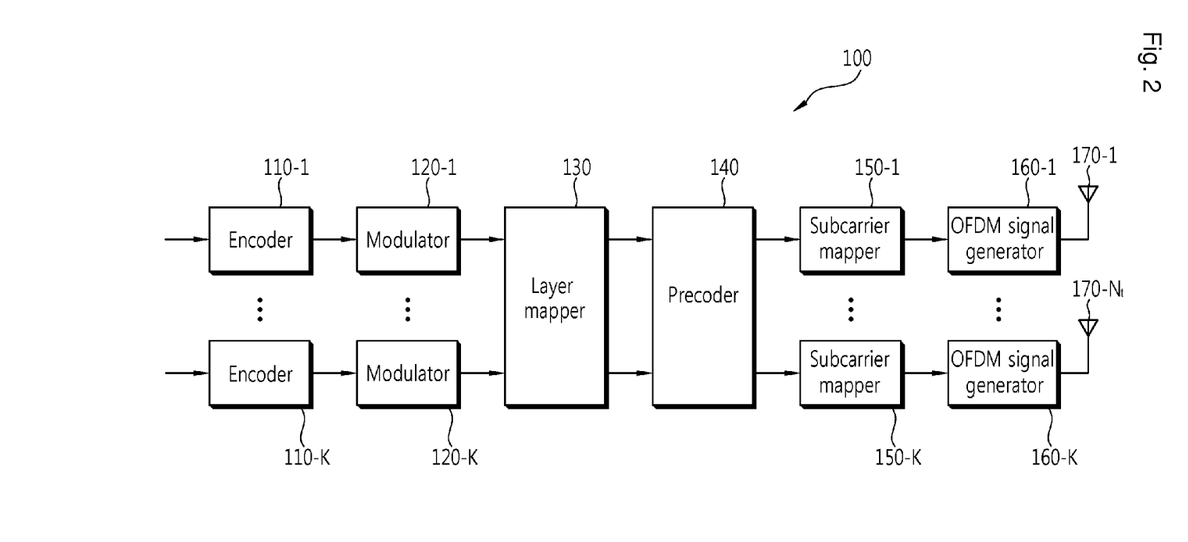
FIG. 2 shows an exemplary structure of a transmitter.

FIG. 2 shows an exemplary structure of a transmitter.

Referring to FIG. 2, a transmitter 100 includes encoders 110-1, ..., 110-K, modulators 120-1, ..., 120-K, a layer mapper 130, a precoder 140, subcarrier mappers 150-1, ..., 150-K, and OFDM signal generators 160-1, ..., 160-K. The transmitter 100 also includes Nt (Nt>1) Tx antennas 170-1, ..., 170-Nt.

The encoders 110-1, ..., 110-K generate coded data by encoding input data according to a predetermined coding scheme. The modulators 120-1, ..., 120-K arrange the coded data into symbols representing locations on a signal constellation. A modulation scheme is not limited to a specific modulation scheme, and may be an m-phase shift keying (m-PSK) or an m-quadrature amplitude modulation (m-QAM). Examples of the m-PSK include binary PSK (BPSK), quadrature PSK (QPSK), and 8-PSK. Examples of the m-QAM include 16-QAM, 64-QAM, and 256-QAM.

The layer mapper 130 defines a layer of an input symbol so that each antenna can distribute a specific symbol to a path of each antenna. The layer is defined as an information path input to the precoder 140. The information path located ahead of the precoder 140 can be called a virtual antenna (or layer).

The precoder 140 processes an input symbol by using a MIMO scheme according to the multiple Tx antennas 170-1, ..., 170-Nt. For example, the precoder 140 can use codebook-based precoding. The precoder 140 distributes an antenna-specific symbol to the subcarrier mappers 150-1, ..., 150-K for a path of a specific antenna. Each information path transmitted to one antenna by the precoder 140 by the use of one subcarrier mapper is called a stream. The antenna may be a physical antenna.

The subcarrier mappers 150-1, ..., 150-K allocate input symbols to suitable subcarriers and then multiplex the resultant symbols according to a user. The OFDM signal generators 160-1, ..., 160-K modulate input symbols according to an OFDM scheme and then outputs OFDM symbols. The OFDM signal generators 160-1, ..., 160-K can perform IFFT on input symbols. A cyclic prefix (CP) may be inserted into a time-domain symbol which has undergone the IFFT. The OFDM symbols are transmitted through the respective Tx antennas 170-1, ..., 170-Nt.

In the MIMO system, the transmitter 100 can operate in two modes. One is an SCW mode and the other is an MCW mode. In the SCW mode, Tx signals transmitted through a MIMO channel have the same data rate. In the MCW mode, data transmitted through the MIMO channel is independently encoded, and thus the Tx signals can have different data rates. The MCW mode operates when a rank is greater than 1.

Now, transmission of a multi-cell specific message will be described. The multi-cell specific message is a message commonly transmitted from a plurality of BSs belonging to the same network. The multi-cell specific message includes information common to a plurality of cells. The multi-cell specific message can be referred to as a single frequency network (SFN) message.

Figure 3:
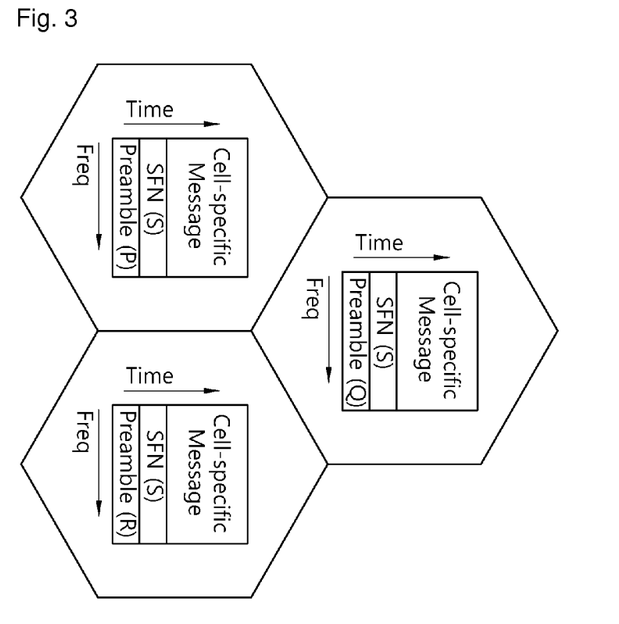
FIG. 3 shows an example of transmission of broadcast data in multiple cells.

FIG. 3 shows an example of transmission of broadcast data in multiple cells.

Referring to FIG. 3, a preamble, an SFN message, and a cell specific message are transmitted in each cell.

The preamble is a sequence (or signal) specifically provided for each cell. The preamble is a synchronization signal for downlink synchronization and can be transmitted through a synchronization channel. The sequence (or signal) specifically provided for each cell may be a midamble or a dedicated reference signal for a specific cell. The preamble may include a cell identifier (ID) to identify each cell.

The SFN message is a multi-cell specific message commonly provided for multiple cells and can be transmitted through a broadcast channel. The SFN message includes information common to a plurality of cells. The SFN message may include system information common to the plurality of cells. For example, the SFN message may include information such as an FFT size, a center frequency, an uplink/downlink ratio, etc. The SFN message may also be a multimedia broadcast multicast service (MBMS) message of an MBMS system.

The cell specific message includes broadcast information limited to one cell and is transmitted through the broadcast channel. The cell specific message may include system information limited to the cell. For example, the cell specific message may include a transmission period of the system information, radio resource allocation information, etc.

For example, in three cells, the preamble uses different sequences P, Q, and R. For the SFN message, the same signal S is used in all cells. That is, each BS transmits the preamble of different sequences and the SFN message of the same signal.

A UE receives the preamble to acquire downlink synchronization. The UE can estimate a channel of each BS by using the preamble of each BS.

Hereinafter, a method for effectively decoding a plurality of SFN messages without having to perform channel estimation according to each preamble will be described. It is assumed that a BS is a multiple antenna system using a plurality of Tx antennas. In the following description, a cell can be replaced with a sector. That is, a preamble may be a signal specified for each sector, a multi-cell specific message may be a multi-sector specific message common to a plurality of sectors, and a cell specific message may be a sector specific message limited to one sector.

Figure 4:
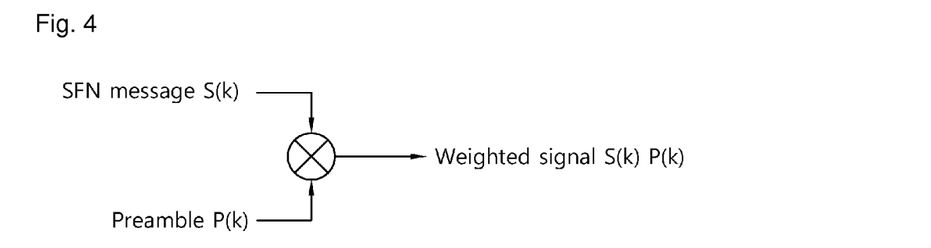
FIG. 4 shows a method for transmitting a single frequency network (SFN) message according to an embodiment of the present invention.

FIG. 4 shows a method for transmitting an SFN message according to an embodiment of the present invention.

Referring to FIG. 4, an SFN message S(k) is multiplied by a preamble P(k) before transmission. The SFN message is multiplexed with the preamble P(k) before transmission. If the preamble is defined as a first signal and the SFN message is defined as a second signal, the second signal is multiplied by the first signal before transmission. The first signal is a signal specifically provided for each cell. The second signal is a signal commonly provided for multiple cells. Herein, a signal to be actually transmitted by a BS is the second signal, and thus the first signal can be regarded to as a weight of the second signal. A signal S(k)P(k) is generated when the second signal is multiplied by the first signal, and can be referred to as a weighted signal of the SFN message. The signal S(k)P(k) may also be referred to as an SFN message weighted with a preamble.

The weighted signal of the SFN message can be transmitted on a plurality of subcarriers in a frequency domain. The weighted signal of the SFN message can be transmitted through a plurality of Tx antennas. The weighted signal of the SFN message may be transmitted through the plurality of Tx antennas according to a transmission method using multiple antennas.

<In Case of Transmitting SFN Message Using Cyclic Delay Diversity (CDD) Scheme>

It is assumed hereinafter that a plurality of BSs transmit an SFN message through two physical antennas. Pmn(k) denotes a kth sequence (or a sequence carried on a kth subcarrier) of a preamble transmitted through an nth antenna of an mth BS. S(k) denotes an SFN message carried on the kth subcarrier.

Figure 5:
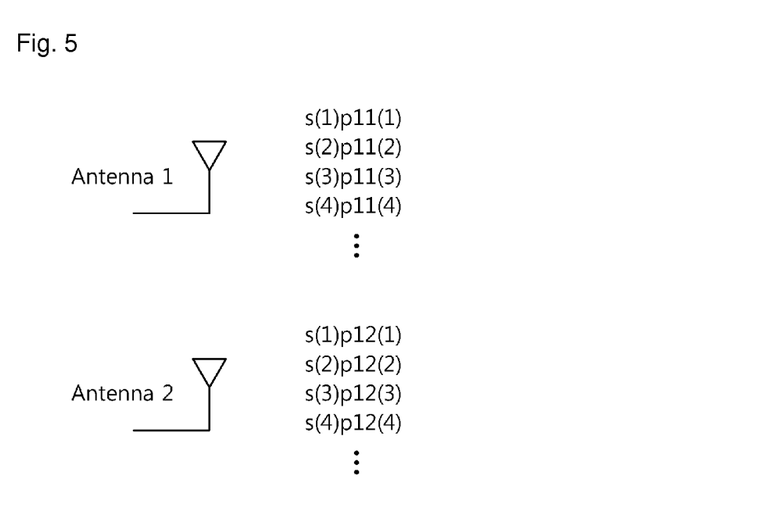
FIG. 5 shows transmission of an SFN message on multiple antennas according to an embodiment of the present invention.

FIG. 5 shows transmission of an SFN message on multiple antennas according to an embodiment of the present invention.

Referring to FIG. 5, an SFN message weighted with a preamble is generated by sequentially multiplying the SFN message by a preamble sequence. The preamble may have a sequence length corresponding to the number of subcarriers on which the SFN message is carried and may be sequentially multiplied by the SFN message.

Table 1 shows an example of an SFN message and a preamble transmitted from two BSs.

TABLE 1

|  |  | BS 1 | | BS 2 | |
| --- | --- | --- | --- | --- | --- |
|  | subcarrier | antenna 1 | antenna 2 | antenna 1 | antenna 2 |
| weighted | 1 | s(1)p11(1) | s(1)p12(1) | s(1)p21(1) | s(1)p22(1) |
| SFN | 2 | s(2)p11(2) | s(2)p12(2) | s(2)p21(2) | s(2)p22(2) |
| message | 3 | s(3)p11(3) | s(3)p12(3) | s(3)p21(3) | s(3)p22(3) |
|  | 4 | s(4)p11(4) | s(4)p12(4) | s(4)p21(4) | s(4)p22(4) |
|  | ... | ... | ... | ... | ... |
| preamble | 1 | p11(1) | p12(1) | p21(1) | p22(1) |
|  | 2 | p11(2) | p12(2) | p21(2) | p22(2) |
|  | 3 | p11(3) | p12(3) | p21(3) | p22(3) |
|  | 4 | p11(4) | p12(4) | p21(4) | p22(4) |
|  | ... | ... | ... | ... | ... |

In a BS 1, the SFN message weighted with the preamble is transmitted in a format of {s(1)p11(1), s(2)p11(2), s(3)p11(3), s(4)p11(4), ...} through an antenna 1 and is transmitted in a format of {s(1)p12(1), s(2)p12(2), s(3)p12(3), s(4)p12(4), ...} through an antenna 2. In a BS 2, the SFN message weighted with the preamble is transmitted in the same manner.

Equation 1 shows an Rx signal r(k) of the SFN message weighted with the preamble according to Table 1.

MathFigure 1

$$r(1)=s(1)\{h11(1)p11(1)+h12(1)p12(1)+h21(1)p21(1)+h22(1)p22(1)\}+v(1)$$

$$r(2)=s(2)\{h11(2)p11(2)+h12(2)p12(2)+h21(2)p21(2)+h22(2)p22(2)\}+v(2)$$

$$r(3)=s(3)\{h11(3)p11(3)+h12(3)p12(3)+h21(3)p21(3)+h22(3)p22(3)\}+v(3)$$

$$r(4)=s(4)\{h11(4)p11(4)+h12(4)p12(4)+h21(4)p21(4)+h22(4)p22(4)\}+v(4) \quad \text{[Math.1]}$$

r(k) denotes an Rx signal transmitted through a $k^{th}$ subcarrier. hmn(k) denotes a channel of a signal transmitted from an $n^{th}$ antenna of an $m^{th}$ BS. v(k) denotes noise of the $k^{th}$ subcarrier.

Equation 2 shows an equivalent channel $h_{eq}(k)$ of the Rx signal r(k) of Equation 1.

MathFigure 2

$$h_{eq}(1)=h11(1)p11(1)+h12(1)p12(1)+h21(1)p21(1)+h22(1)p22(1)+w(1)$$

$$h_{eq}(2)=h11(2)p11(2)+h12(2)p12(2)+h21(2)p21(2)+h22(2)p22(2)+w(2)$$

$$h_{eq}(3)=h11(3)p11(3)+h12(3)p12(3)+h21(3)p21(3)+h22(3)p22(3)+w(3)$$

$$h_{eq}(4)=h11(4)p11(4)+h12(4)p12(4)+h21(4)p21(4)+h22(4)p22(4)+w(4) \quad \text{[Math.2]}$$

$h_{eq}(k)$ denotes an equivalent channel of the Rx signal r(k) transmitted on the $k^{th}$ subcarrier. w(k) denotes noise of the $k^{th}$ subcarrier.

If a UE knows the equivalent channel of the Rx signal r(k), the UE can immediately decode the SFN message S(k) by applying the equivalent channel to the Rx signal. That is, the UE does not have to estimate all channels of respective antennas of each BS. Further, the UE does not have to know all preambles used by each BS.

The equivalent channel $h_{eq}(k)$ of the Rx signal r(k) is an Rx value of the preamble. Since the UE knows the Rx value of the preamble, the UE can simply decode the SFN message S(k) by applying the Rx value of the preamble to the Rx signal r(k).

Figure 6:
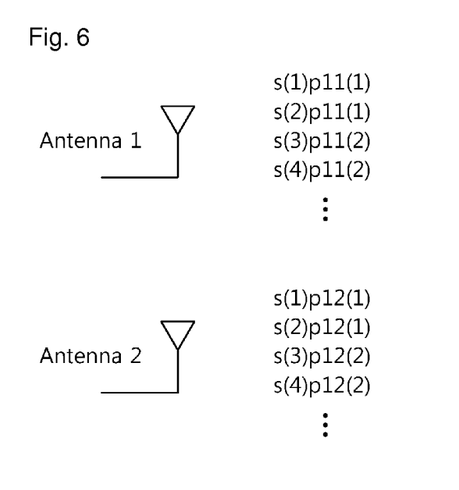
FIG. 6 shows transmission of an SFN message on multiple antennas according to another embodiment of the present invention.

FIG. 6 shows transmission of an SFN message on multiple antennas according to another embodiment of the present invention.

Referring to FIG. 6, an SFN message weighted with a preamble is generated by repetitively multiplying the SFN message by the preamble. Instead of a sequence format, the preamble may have a repetitive signal structure in which the preamble is repetitively mapped to subcarriers according to a specific repetition period.

Table 2 shows another example of an SFN message and a preamble transmitted from two BSs.

TABLE 2

|  |  | BS 1 | | BS 2 | |
| --- | --- | --- | --- | --- | --- |
|  | subcarrier | antenna 1 | antenna 2 | antenna 1 | antenna 2 |
| weighted | 1 | s(1)p11(1) | s(1)p12(1) | s(1)p21(1) | s(1)p22(1) |
| SFN | 2 | s(2)p11(1) | s(2)p12(1) | s(2)p21(1) | s(2)p22(1) |
| message | 3 | s(3)p11(2) | s(3)p12(2) | s(3)p21(2) | s(3)p22(2) |
|  | 4 | s(4)p11(2) | s(4)p12(2) | s(4)p21(2) | s(4)p22(2) |
|  | ... | ... | ... | ... | ... |
| preamble | 1 | p11(1) | p12(1) | p21(1) | p22(1) |
|  | 2 | 0 | 0 | 0 | 0 |
|  | 3 | p11(2) | p12(2) | p21(2) | p22(2) |
|  | 4 | 0 | 0 | 0 | 0 |
|  | ... | ... | ... | ... | ... |

For a subcarrier on which the preamble is not transmitted, a preamble of an adjacent subcarrier is multiplied by the SFN message to generate the SFN message weighted with the preamble. In a BS 1, the SFN message weighted with the preamble is transmitted in a format of {s(1)p11(1), s(2)p11(1), s(3)p11(2), s(4)p11(2), ...} through an antenna 1 and is transmitted in a format of {s(1)p12(1), s(2)p12(1), s(3)p12(2), s(4)p12(2), ...} through an antenna 2. In a BS 2, the SFN message weighted with the preamble is transmitted in the same manner.

Equation 3 shows an Rx signal r(k) of the SFN message weighted with the preamble according to Table 2.

MathFigure 3

$$r(1)=s(1)\{h11(1)p11(1)+h12(1)p12(1)+h21(1)p21(1)+h22(1)p22(1)\}+v(1)$$

$$r(2)=s(2)\{h11(2)p11(1)+h12(2)p12(1)+h21(2)p21(1)+h22(2)p22(1)\}+v(2)$$

$$r(3)=s(3)\{h11(3)p11(2)+h12(3)p12(2)+h21(3)p21(2)+h22(3)p22(2)\}+v(3)$$

$$r(4)=s(4)\{h11(4)p11(2)+h12(4)p12(2)+h21(4)p21(2)+h22(4)p22(2)\}+v(4) \quad \text{[Math.3]}$$

Equation 4 shows an equivalent channel $h_{eq}(k)$ of the Rx signal r(k) of Equation 3.

MathFigure 4

$$h_{eq}(1)=h11(1)p11(1)+h12(1)p12(1)+h21(1)p21(1)+h22(1)p22(1)+w(1)$$

$$h_{eq}(3)=h11(3)p11(2)+h12(3)p12(2)+h21(3)p21(2)+h22(3)p22(2)+w(3) \quad \text{[Math.4]}$$

Since the equivalent channel $h_{eq}(k)$ of the Rx signal r(k) is the Rx value of the preamble, a UE can simply decode the SFN message S(k) by applying the Rx value of the preamble to the Rx signal r(k).

The preamble may have a structure in which the preamble is repeated on different subcarriers for each antenna. The preamble may be repeated on odd subcarriers in one antenna, and may be repeated on even subcarriers in another antenna. For a subcarrier on which the preamble is not transmitted, a preamble of an adjacent subcarrier is multiplied by the SFN message to generate the SFN message weighted with the preamble.

Table 3 shows another example of an SFN message and a preamble transmitted from two BSs.

TABLE 3

|  |  | BS 1 | | BS 2 | |
| --- | --- | --- | --- | --- | --- |
|  | subcarrier | antenna 1 | antenna 2 | antenna 1 | antenna 2 |
| weighted | 1 | s(1)p11(1) | s(1)p12(1) | s(1)p21(1) | s(1)p22(1) |
| SFN | 2 | s(2)p11(1) | s(2)p12(1) | s(2)p21(1) | s(2)p22(1) |
| message | 3 | s(3)p11(2) | s(3)p12(2) | s(3)p21(2) | s(3)p22(2) |
|  | 4 | s(4)p11(2) | s(4)p12(2) | s(4)p21(2) | s(4)p22(2) |
|  | ... | ... | ... | ... | ... |
| preamble | 1 | p11(1) | 0 | p21(1) | 0 |
|  | 2 | 0 | p12(1) | 0 | p22(1) |
|  | 3 | p11(2) | 0 | p21(2) | 0 |
|  | 4 | 0 | p12(2) | 0 | p22(2) |
|  | ... | ... | ... | ... | ... |

The Rx signal r(k) of the SFN message weighted with the preamble received by the UE from the two BSs is expressed by Equation 3 above. In this case, the equivalent channel can be expressed by Equation 5.

MathFigure 5

$$h_{eq}(1)=h11(1)p11(1)+h21(1)p21(1)+w(1)$$

$$h_{eq}(2)=h12(2)p12(1)+h22(2)p22(1)+w(2)$$

$$h_{eq}(3)=h11(3)p11(2)+h21(3)p21(2)+w(3)$$

$$h_{eq}(4)=h12(4)p12(2)+h22(4)p22(2)+w(4) \quad \text{[Math.5]}$$

The UE can decode the SFN message S(k) by applying the Rx value of the preamble to the Rx signal r(k).

<In Case of Transmitting SFN Message Using Space-Frequency Block Code (SFBC) Scheme>

Among transmission methods using multiple antennas, an SFBC scheme can be used. A BS can transmit an SFN message by using a plurality of physical antennas or a plurality of virtual antennas. For example, to transmit the SFN message through two Tx antennas, two physical antennas or two virtual antennas may be used. The two virtual antennas can be formed by grouping four physical antennas into two groups according to the CDD scheme.

Figure 7:
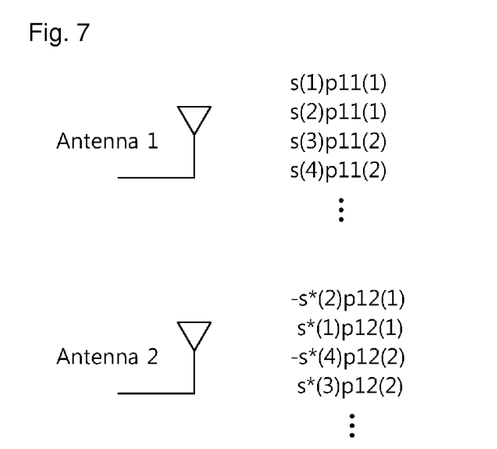
FIG. 7 shows transmission of an SFN message on multiple antennas according to another embodiment of the present invention.

FIG. 7 shows transmission of an SFN message on multiple antennas according to another embodiment of the present invention.

Referring to FIG. 7, an SFN message sequence is configured according to an SFBC scheme. A weighted SFN message is generated by multiplying an SFN message configured according to the SFBC scheme by a preamble. The preamble may have a repetitive structure in which the preamble is repetitively carried on different subcarriers for each antenna.

Table 4 shows another example of an SFN message and a preamble transmitted from two BSs.

TABLE 4

|  | sub-carrier | BS 1 antenna 1 | BS 1 antenna 2 | BS 2 antenna 1 | BS 2 antenna 2 |
|---|---|---|---|---|---|
| weighted SFN message | 1 | s(1)p11(1) | −s*(2)p12(1) | s(1)p21(1) | −s*(2)p22(1) |
|  | 2 | s(2)p11(1) | s(1)p12(1) | s(2)p21(1) | s(1)p22(1) |
|  | 3 | s(3)p11(2) | −s*(4)p12(2) | s(3)p21(2) | −s*(4)p22(2) |
|  | 4 | s(4)p11(2) | s(3)p12(2) | s(4)p21(2) | s(3)p22(2) |
|  | ... | ... | ... | ... | ... |
| preamble | 1 | p11(1) | 0 | p21(1) | 0 |
|  | 2 | 0 | p12(1) | 0 | p22(1) |
|  | 3 | p11(2) | 0 | p21(2) | 0 |
|  | 4 | 0 | p12(2) | 0 | p22(2) |
|  | ... | ... | ... | ... | ... |

The preamble is repeated on odd subcarriers in one antenna, and is repeated on even subcarriers in another antenna. A preamble of one antenna is transmitted for each subcarrier. For a subcarrier on which the preamble is not transmitted, a preamble of an adjacent subcarrier is multiplied by the SFN message sequence to generate the SFN message weighted with the preamble. s*(1), s*(2), s*(3), and s*(4) are complex conjugates of s(1), s(2), s(3), and s(4), respectively.

Equation 6 shows an Rx signal r(k) of the SFN message weighted with the preamble according to Table 4.

MathFigure 6

$$r(1)=s(1)\{h11(1)p11(1)+h21(1)p21(1)\}-s^*(2)\{h12(1)p12(1)+h22(1)p22(1)\}+v(1)$$

$$r(2)=s(2)\{h11(2)p11(1)+h21(2)p21(1)\}+s^*(1)\{h12(2)p12(1)+h22(2)p22(1)\}+v(2)$$

$$r(3)=s(3)\{h11(3)p11(2)+h21(3)p21(2)\}-s^*(4)\{h12(3)p12(2)+h22(3)p22(2)\}+v(3)$$

$$r(4)=s(4)\{h11(4)p11(2)+h21(4)p21(2)\}+s^*(3)\{h12(4)p12(2)+h22(4)p22(2)\}+v(4) \quad [\text{Math.6}]$$

Equation 7 shows an equivalent channel $h_{eq}(k)$ of the Rx signal r(k) of Equation 6.

MathFigure 7

$$h_{eq}(1)=h11(1)p11(1)+h21(1)p21(1)+w(1)$$

$$h_{eq}(2)=h12(2)p12(1)+h22(2)p22(1)+w(2)$$

$$h_{eq}(3)=h11(3)p11(2)+h21(3)p21(2)+w(3)$$

$$h_{eq}(4)=h12(4)p12(2)+h22(4)p22(2)+w(4) \quad [\text{Math.7}]$$

The equivalent channel $h_{eq}(k)$ is an Rx value of the preamble. Thus, a UE can decode the SFN message S(k) according to a general SFBC scheme by applying the equivalent channel $h_{eq}(k)$ to the Rx signal r(k).

Figure 8:
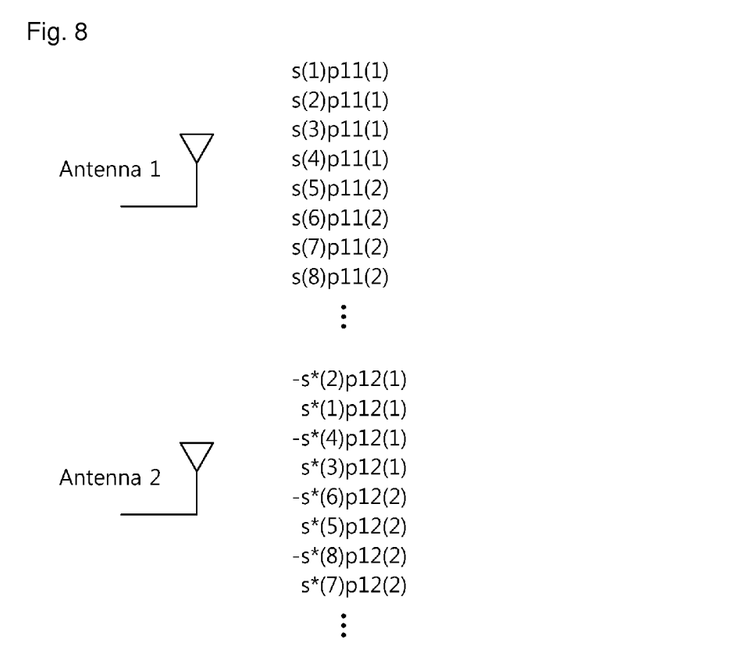
FIG. 8 shows transmission of an SFN message on multiple antennas according to another embodiment of the present invention.

FIG. 8 shows transmission of an SFN message on multiple antennas according to another embodiment of the present invention.

Referring to FIG. 8, Table 5 shows another example of an SFN message and a preamble transmitted from two BSs. The preamble has a repetition period different from that of Table 4.

TABLE 5

|  | sub-carrier | BS 1 antenna 1 | BS 1 antenna 2 | BS 2 antenna 1 | BS 2 antenna 2 |
|---|---|---|---|---|---|
| weighted SFN message | 1 | s(1)p11(1) | −s*(2)p12(1) | s(1)p21(1) | −s*(2)p22(1) |
|  | 2 | s(2)p11(1) | s(1)p12(1) | s(2)p21(1) | s(1)p22(1) |
|  | 3 | s(3)p11(1) | −s*(4)p12(1) | s(3)p21(1) | −s*(4)p22(1) |
|  | 4 | s(4)p11(1) | s(3)p12(1) | s(4)p21(1) | s(3)p22(1) |
|  | 5 | s(5)p11(1) | −s*(6)p12(2) | s(5)p21(2) | −s*(6)p22(2) |
|  | 6 | s(6)p11(2) | s(5)p12(2) | s(6)p21(2) | s(5)p22(2) |
|  | 7 | s(7)p11(2) | −s*(8)p12(2) | s(7)p21(2) | −s*(8)p22(2) |
|  | 8 | s(8)p11(2) | s(7)p12(2) | s(8)p21(2) | s(7)p22(2) |
|  | ... | ... | ... | ... | ... |
| preamble | 1 | p11(1) | 0 | p21(1) | 0 |
|  | 2 | 0 | 0 | 0 | 0 |
|  | 3 | 0 | p12(1) | 0 | p22(1) |
|  | 4 | 0 | 0 | 0 | 0 |
|  | 5 | p11(2) | 0 | p21(2) | 0 |
|  | 6 | 0 | 0 | 0 | 0 |
|  | 7 | 0 | p12(2) | 0 | p22(2) |
|  | 8 | 0 | 0 | 0 | 0 |
|  | ... | ... | ... | ... | ... |

Equation 8 shows an Rx signal r(k) of the SFN message weighted with the preamble according to Table 5.

MathFigure 8

$$r(1)=s(1)\{h11(1)p11(1)+h21(1)p21(1)\}-s^*(2)\{h12(1)p12(1)+h22(1)p22(1)\}+v(1)$$

$$r(2)=s(2)\{h11(2)p11(1)+h21(2)p21(1)\}+s^*(1)\{h12(2)p12(1)+h22(2)p22(1)\}+v(2)$$

$$r(3)=s(3)\{h11(3)p11(1)+h21(3)p21(1)\}-s^*(4)\{h12(3)p12(1)+h22(3)p22(1)\}+v(3)$$

$$r(4)=s(4)\{h11(4)p11(1)+h21(4)p21(1)\}+s^*(3)\{h12(4)p12(1)+h22(4)p22(1)\}+v(4) \quad [\text{Math.8}]$$

Equation 9 shows an equivalent channel $h_{eq}(k)$ of the Rx signal r(k) of Equation 8.

MathFigure 9

$$h_{eq}(1)=h11(1)p11(1)+h21(1)p21(1)+w(1)$$

$$h_{eq}(3)=h12(3)p12(1)+h22(3)p22(1)+w(3) \quad [\text{Math.9}]$$

A UE can decode the SFN message S(k) according to a general SFBC scheme by applying the equivalent channel $h_{eq}(k)$ to the Rx signal r(k).

Figure 9:
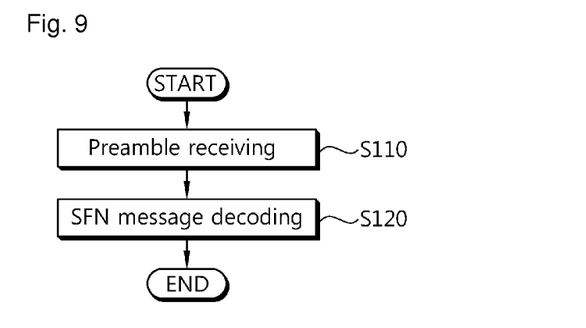
FIG. 9 is a flowchart showing a method for acquiring an SFN message according to an embodiment of the present invention.

FIG. 9 is a flowchart showing a method for acquiring an SFN message according to an embodiment of the present invention.

Referring to FIG. 9, a UE receives a downlink preamble (step S110). The downlink preamble may be transmitted on contiguous subcarriers in a frequency domain or may be transmitted on subcarriers spaced apart from one another by a specific spacing in the frequency domain. The UE can know an Rx value of the preamble transmitted from a plurality of BSs.

The UE decodes the SFN message (step S120). The SFN message is transmitted through a broadcast channel by the plurality of BSs. An SFN message weighted with the preamble is generated by multiplying the SFN message by the preamble. The SFN message weighted with the preamble is transmitted on subcarriers in the frequency domain. An equivalent channel of the SFN message weighted with the preamble is equivalent to the Rx value of the preamble. Therefore, the UE can decode the SFN message by applying the Rx value of the preamble to the SFN weighted with the preamble. The BSs can transmit the preamble and the SFN message according to a transmission method using multiple antennas, and the UE can decode the SFN message weighted with the preamble according to the transmission method.

Although it has been described above that two BSs transmit a preamble and an SFN message through two physical antennas or virtual antennas, this is for exemplary purposes only, and thus the present invention is not limited thereto. Therefore, various modifications can be made in the number of BSs, the number of antennas used by each BS, a repetition period of a preamble, etc., and this is within the technical scope of the present invention.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method for acquiring a multi-cell specific message in a wireless communication system, the method comprising:
   receiving a downlink preamble;
   receiving a signal including the multi-cell specific message weighted with the downlink preamble, wherein a receive (Rx) value of the downlink preamble indicates characteristics of a channel that models a plurality of channels on which the signal is received; and
   decoding the received signal in order to acquire the multi-cell specific message by applying the Rx value of the downlink preamble to the received signal.

2. The method of claim 1, wherein the downlink preamble is received on all subcarriers in a frequency domain.

3. The method of claim 1, wherein the downlink preamble is received on subcarriers spaced apart from one another by a specific spacing in a frequency domain.

4. The method of claim 1, wherein the received signal including the weighted multi-cell specific message corresponds to a space-frequency block code (SFBC) scheme using multiple antennas.

5. The method of claim 1, wherein the received signal including the weighted multi-cell specific message corresponds to a cyclic delay diversity (CDD) scheme using multiple antennas.

6. The method of claim 1, wherein the characteristics indicated by the Rx value of the downlink preamble include a noise of the channel that models the plurality of channels.

7. A method for transmitting a multi-cell specific signal in a wireless communication system, the method comprising:
   transmitting a preamble;
   multiplying the preamble specifically provided for each cell with multi-cell specific message commonly provided for multiple cells in order to generate a weighted signal; and
   transmitting the weighted signal on a plurality of subcarriers in a frequency domain,
   wherein a receive (Rx) value of the preamble at a terminal indicates characteristics of a channel that models a plurality of channels on which the weighted signal is transmitted, and
   wherein the Rx value of the preamble is for facilitating decoding of the weighted signal by the terminal in order to acquire the multi-cell specific message.

8. The method of claim 7, wherein the weighted signal is transmitted on a plurality of transmit antennas.

9. The method of claim 7, wherein the preamble is repetitively multiplied by the multi-cell specific message.

10. The method of claim 7, wherein the characteristics indicated by the Rx value of the downlink preamble include a noise of the channel that models the plurality of channels.

* * * * *